# (12) United States Patent
Xie et al.

(10) Patent No.: US 10,585,884 B2
(45) Date of Patent: *Mar. 10, 2020

(54) CLIENT-SIDE SEARCH TEMPLATES FOR ONLINE SOCIAL NETWORKS

(71) Applicant: Facebook, Inc., Menlo Park, CA (US)

(72) Inventors: Tao Xie, Bellevue, WA (US); Rousseau Newaz Kazi, San Francisco, CA (US); Maxime Boucher, Mountain View, CA (US); Yunnan Wu, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 349 days.

This patent is subject to a terminal disclaimer.

(21) Appl. No.: 15/622,929

(22) Filed: Jun. 14, 2017

(65) Prior Publication Data

US 2017/0286480 A1 Oct. 5, 2017

Related U.S. Application Data

(63) Continuation of application No. 15/061,783, filed on Mar. 4, 2016, now Pat. No. 9,720,956, which is a (Continued)

(51) Int. Cl.
*G06F 16/242* (2019.01)
*G06F 16/33* (2019.01)
(Continued)

(52) U.S. Cl.
CPC ........ *G06F 16/243* (2019.01); *G06F 16/3344* (2019.01); *G06F 16/9535* (2019.01);
(Continued)

(58) Field of Classification Search
CPC .............. G06F 16/243; G06F 16/3344; G06F 16/9535; G06F 17/2705; G06Q 50/01; H04L 65/403
(Continued)

(56) References Cited

U.S. PATENT DOCUMENTS

2009/0254971 A1* 10/2009 Herz .................. G06Q 10/10
726/1
2011/0258049 A1* 10/2011 Ramer .................. G06Q 30/02
705/14.66
(Continued)

FOREIGN PATENT DOCUMENTS

CN 102474529 A 5/2012
CN 102929950 A 2/2013
(Continued)

OTHER PUBLICATIONS

European Office Action received from the EPO, for European Patent Application No. 14 175 860.7-1871, dated Nov. 23, 2017.
(Continued)

*Primary Examiner* — Dung K Chau
(74) *Attorney, Agent, or Firm* — Jordan IP Law, LLC

(57) ABSTRACT

In one embodiment, a method includes receiving, at the mobile client system, a text string inputted into a query field by a first user, accessing, from a local data store, a set of grammar templates, each grammar template comprising query tokens referencing an object stored in the local data store, generating one or more natural-language suggested queries by matching portions of the text string to query tokens of the grammar templates, each suggested query comprising references to one or more of the objects stored in the local data store and the natural-language string of the matching grammar template, calculating a cost for each grammar template based at least in part on one or more portions of text string not corresponding to one of the query tokens, and displaying one or more suggested queries to the first user, each having a calculated cost below a threshold cost value.

20 Claims, 11 Drawing Sheets

Related U.S. Application Data continuation of application No. 14/158,594, filed on Jan. 17, 2014, now Pat. No. 9,336,300.

(51) Int. Cl.
    *G06F 16/9535* (2019.01)
    *G06Q 50/00* (2012.01)
    *G06F 17/27* (2006.01)
    *H04L 29/06* (2006.01)

(52) U.S. Cl.
    CPC ......... *G06F 17/2705* (2013.01); *G06Q 50/01* (2013.01); *H04L 65/403* (2013.01)

(58) Field of Classification Search
    USPC ................................ 707/771, 749, 728, 259
    See application file for complete search history.

(56) References Cited

U.S. PATENT DOCUMENTS

| | | | |
|---|---|---|---|
| 2012/0173373 A1* | 7/2012 | Soroca | G06Q 30/0241 |
| | | | 705/26.3 |
| 2013/0086057 A1 | 4/2013 | Harrington | |
| 2013/0124538 A1 | 5/2013 | Lee | |
| 2013/0124542 A1 | 5/2013 | Lee | |
| 2013/0144899 A1* | 6/2013 | Lee | G06Q 50/01 |
| | | | 707/759 |
| 2014/0040285 A1* | 2/2014 | Rubinstein | G06Q 50/01 |
| | | | 707/751 |
| 2014/0188862 A1* | 7/2014 | Campbell | G06Q 50/01 |
| | | | 707/728 |
| 2014/0188899 A1* | 7/2014 | Whitnah | G06Q 10/10 |
| | | | 707/749 |
| 2014/0188935 A1* | 7/2014 | Vee | G06Q 30/0241 |
| | | | 707/771 |
| 2014/0201838 A1 | 7/2014 | Varsanyi | |

FOREIGN PATENT DOCUMENTS

| | | |
|---|---|---|
| CN | 102999560 A | 3/2013 |
| JP | 2009-146315 A | 7/2009 |
| JP | 2010-277322 A | 12/2010 |
| WO | WO 2014/182608 A1 | 11/2014 |

OTHER PUBLICATIONS

Office Action received from the Chinese Patent Office for Chinese Patent Application No. 2017109476303, dated Apr. 20, 2018.
Japanese Notification of Reasons for Rejection received for Japanese Patent Application No. 2017-079614, dated Jan. 23, 2018.
Notice of Allowance received for Korean Patent Application No. 10-2017-7001245, dated Feb. 26, 2018.
Notice of Acceptance for Patent Application was received from the Australian IP Government, for Australian Patent Application No. 2017200106, dated Feb. 27, 2018.

\* cited by examiner

US 10,585,884 B2

CLIENT-SIDE SEARCH TEMPLATES FOR ONLINE SOCIAL NETWORKS

PRIORITY

This application is a continuation under 35 U.S.C. § 120 of U.S. patent application Ser. No. 15/061,783, filed 4 Mar. 2016, which is a continuation under 35 U.S.C. § 120 of U.S. patent application Ser. No. 14/158,594, filed 17 Jan. 2014, issued as U.S. Pat. No. 9,336,300 on 10 May 2016, each of which is incorporated herein by reference.

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may transmit over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, a method may parse a unstructured text query using grammar templates and entities stored client-side. Instead of using a full grammar model to generate suggested queries client-side, the suggested queries can be generated using a set of pre-defined templates and social-graph entities stored on the client. A pre-determined number of grammar templates and high-coefficient entities can be stored client-side so that suggested queries can be quickly generated client-side in response to text inputs from a user. These stored templates and entities may cover 90% or more of the queries run by users. The stored grammar templates may be determined based on globally popular queries and/or personalize templates based on queries that are popular with the user, which may then be converted into templates. Popular queries/templates may include, for example, "Friends of [user]", "Photos of [user]", or "Friends who live near [location]". The stored entities may be determined by pre-selecting particular entity-types (e.g., all the user's friends, pages administered by the user, groups the user belongs to, events the user has signed-up for, and apps the user has loaded), and/or by selecting a threshold number of entities having the highest affinity.

In particular embodiments, when a user enters a text string into a query field, the client-side app will align that text string against the stored templates and compute the cost for each template. Essentially, cost is determined by penalizing each template for each deviation the text string makes from the template (missing words, word variations, etc.). The lowest cost templates are then determined to be the best matches. The highest ranked templates may then displayed to the user as suggested queries. Similarly, the text string may be parsed to identify entities that match portions of the text string. For example, if a user types in the text query "friends of f", the client-side app may access a stored grammar template for "friends of [user]" and match that up to the stored entity for the user "Fred", thus suggesting the structured query "friends of Fred". Alternatively, the client-side app may match the text query to the grammar template "friends of friends of [user]", and suggest the partial structured query "friends of friends of . . . ", which the user could select and then continue entering text.

DESCRIPTION OF EXAMPLE EMBODIMENTS

System Overview

Figure 1:
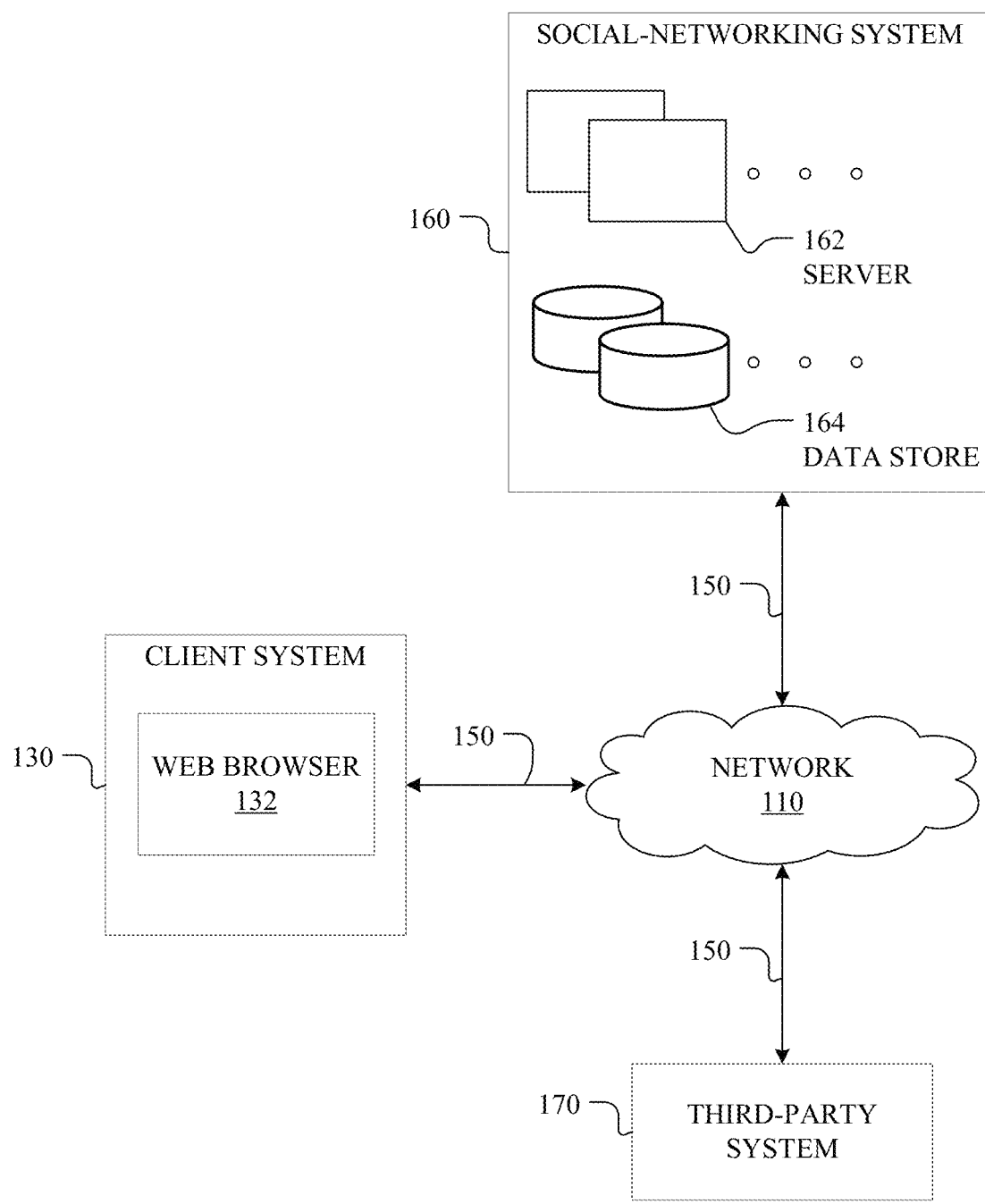
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational database. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (i.e., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Ad-pricing modules may combine social information, the current time, location information, or other suitable information to provide relevant advertisements, in the form of notifications, to a user.

Social Graphs

Figure 2:
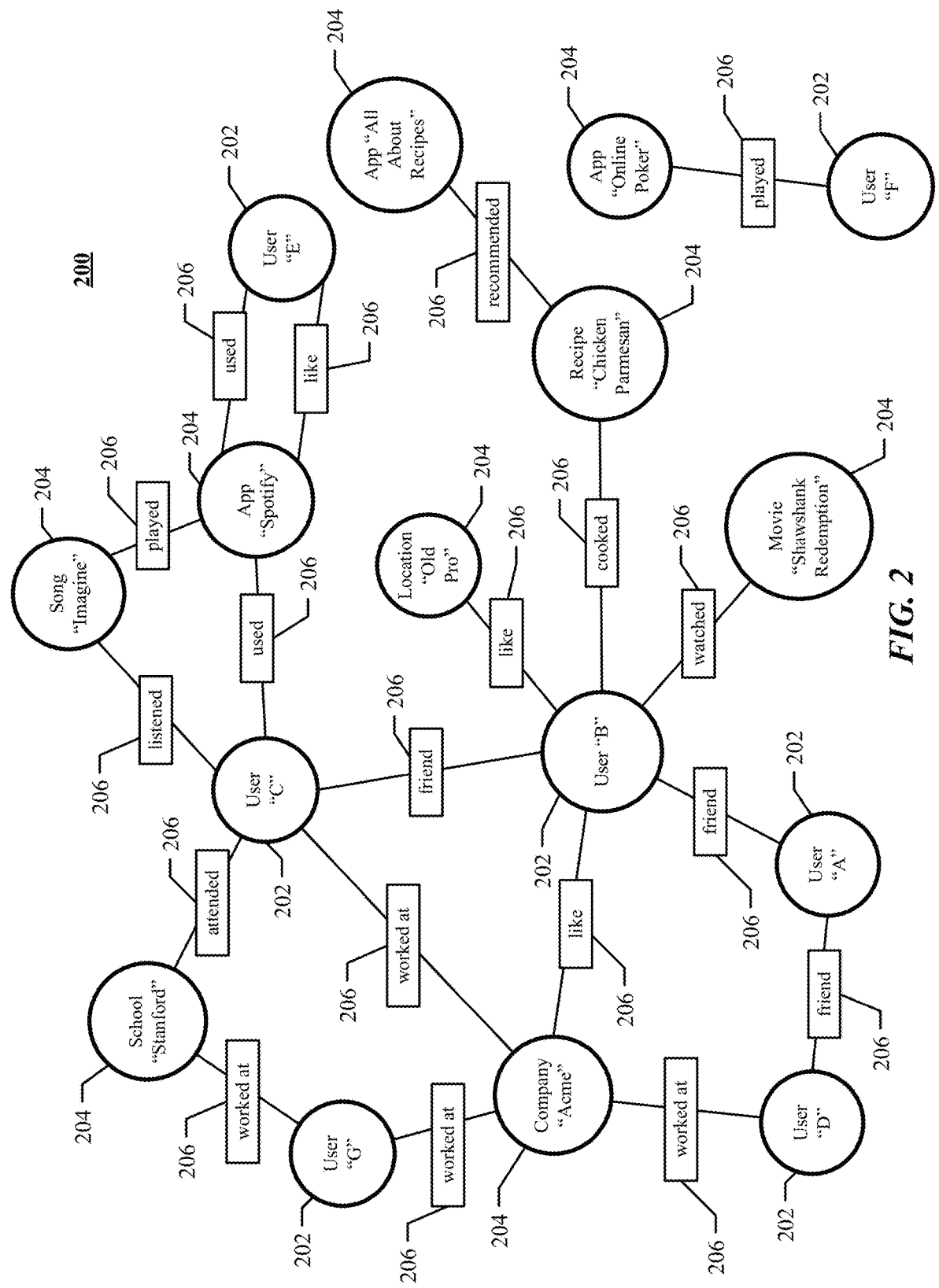
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a first user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a first user registers for an account with social-networking system 160, social-networking system 160 may create a first user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to transmit to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to transmit to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Typeahead Processes

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested webpage (such as, for example, a user-profile page, a concept-profile page, a search-results webpage, or another suitable page of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to user, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element.

In particular embodiments, as a user types or otherwise enters text into a form used to add content or make declarations in various sections of the user's profile page, home page, or other page, the typeahead process may work in conjunction with one or more frontend (client-side) and/or backend (server-side) typeahead processes (hereinafter referred to simply as "typeahead process") executing at (or within) the social-networking system 160 (e.g., within servers 162), to interactively and virtually instantaneously (as appearing to the user) attempt to auto-populate the form with a term or terms corresponding to names of existing social-graph elements, or terms associated with existing social-graph elements, determined to be the most relevant or best match to the characters of text entered by the user as the user enters the characters of text. Utilizing the social-graph information in a social-graph database or information extracted and indexed from the social-graph database, including information associated with nodes and edges, the typeahead processes, in conjunction with the information from the social-graph database, as well as potentially in conjunction with various others processes, applications, or databases located within or executing within social-networking system 160, may be able to predict a user's intended declaration with a high degree of precision. However, the social-networking system 160 can also provide users with the freedom to enter essentially any declaration they wish, enabling users to express themselves freely.

In particular embodiments, as a user enters text characters into a form box or other field, the typeahead processes may attempt to identify existing social-graph elements (e.g., user nodes 202, concept nodes 204, or edges 206) that match the string of characters entered in the user's declaration as the user is entering the characters. In particular embodiments, as the user enters characters into a form box, the typeahead process may read the string of entered textual characters. As each keystroke is made, the frontend-typeahead process may transmit the entered character string as a request (or call) to the backend-typeahead process executing within social-networking system 160. In particular embodiments, the typeahead processes may communicate via AJAX (Asynchronous JavaScript and XML) or other suitable techniques, and particularly, asynchronous techniques. In particular embodiments, the request may be, or comprise, an XMLHTTPRequest (XHR) enabling quick and dynamic sending and fetching of results. In particular embodiments, the typeahead process may also transmit before, after, or with the request a section identifier (section ID) that identifies the particular section of the particular page in which the user is making the declaration. In particular embodiments, a user ID parameter may also be sent, but this may be unnecessary in some embodiments, as the user may already be "known" based on the user having logged into (or otherwise been authenticated by) the social-networking system 160.

In particular embodiments, the typeahead process may use one or more matching algorithms to attempt to identify matching social-graph elements. In particular embodiments, when a match or matches are found, the typeahead process may transmit a response (which may utilize AJAX or other suitable techniques) to the user's client system 130 that may include, for example, the names (name strings) or descriptions of the matching social-graph elements as well as, potentially, other metadata associated with the matching social-graph elements. As an example and not by way of limitation, if a user entering the characters "pok" into a query field, the typeahead process may display a drop-down menu that displays names of matching existing profile pages and respective user nodes 202 or concept nodes 204, such as a profile page named or devoted to "poker" or "pokemon", which the user can then click on or otherwise select thereby confirming the desire to declare the matched user or concept name corresponding to the selected node. As another example and not by way of limitation, upon clicking "poker," the typeahead process may auto-populate, or causes the web browser 132 to auto-populate, the query field with the declaration "poker". In particular embodiments, the typeahead process may simply auto-populate the field with the name or other identifier of the top-ranked match rather than display a drop-down menu. The user may then confirm the auto-populated declaration simply by keying "enter" on his or her keyboard or by clicking on the auto-populated declaration.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

Structured Search Queries

Figure 3:
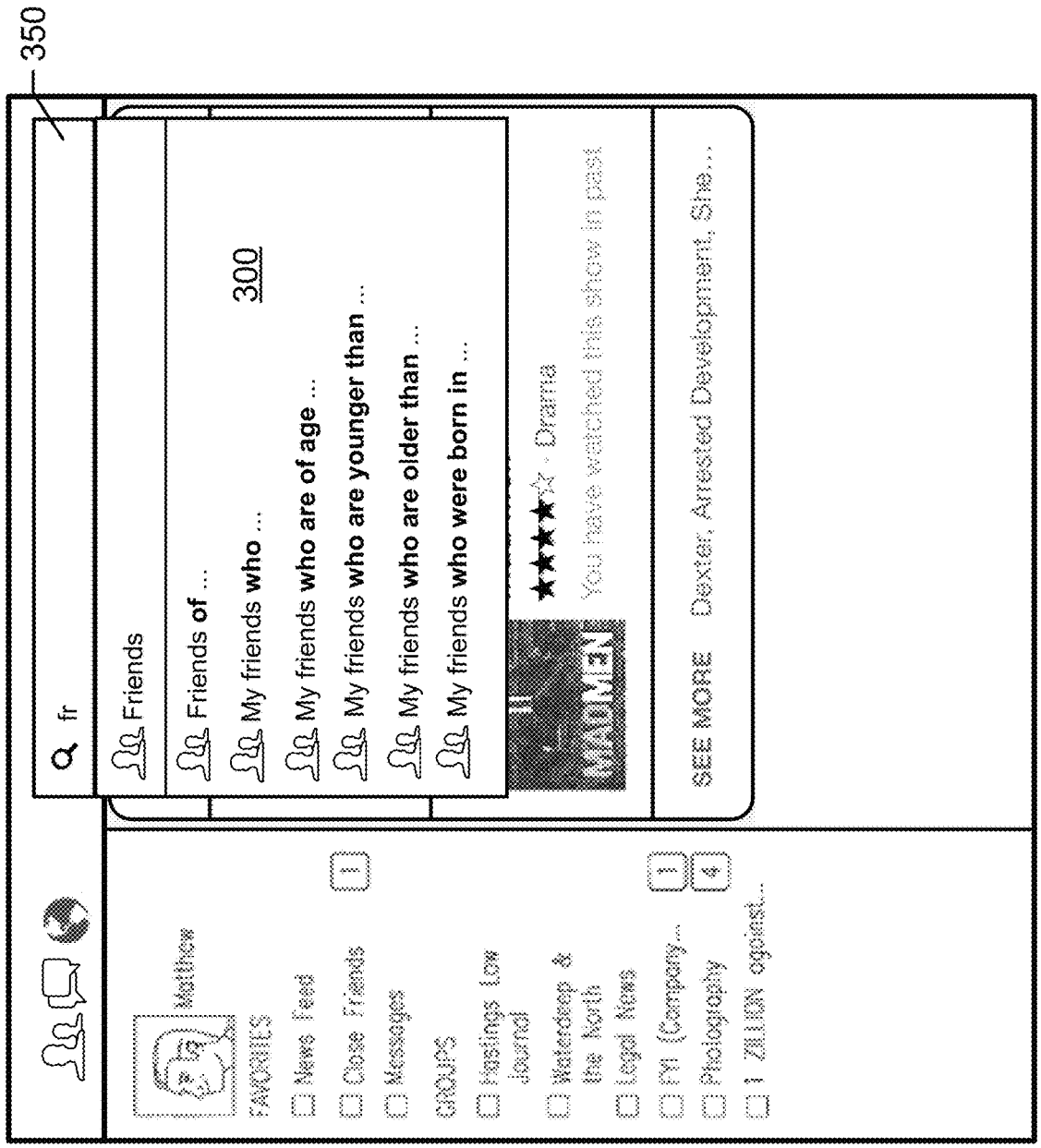
FIG. 3 illustrates an example webpage of an online social network.

FIG. 3 illustrates an example webpage of an online social network. In particular embodiments, a first user (also referred to as the "user" or "querying user," corresponding to a particular user node 202) may submit a query to the social-network system 160 by inputting text into a search-query field 350. A first user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a first user may input any character string into search-query field 350 to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile pages, content-profile pages, or external resources) that are most likely to be related to the search query. To conduct a search, a first user may input or transmit a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile pages, external webpages, or any combination thereof. The social-networking system 160 may then generate a search-results webpage with search results corresponding to the identified content and transmit the search-results webpage to the first user. The search results may be presented to the user, often in the form of a list of links on the search-results webpage, each link being associated with a different webpage that contains some of the identified resources or content. In particular embodiments, each link in the search results may be in the form of a Uniform Resource Locator (URL) that specifies where the corresponding webpage is located and the mechanism for retrieving it. The social-networking system 160 may then transmit the search-results webpage to the web browser 132 on the first user's client system 130. The first user may then click on the URL links or otherwise select the content from the search-results webpage to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the first user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

In particular embodiments, the typeahead processes described herein may be applied to search queries entered by a user. As an example and not by way of limitation, as a user enters text characters into a search field, a typeahead process may attempt to identify one or more user nodes 202, concept nodes 204, or edges 206 that match the string of characters entered search field as the user is entering the characters. As the typeahead process receives requests or calls including a string or n-gram from the text query, the typeahead process may perform or causes to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may transmit a response to the user's client system 130 that may include, for example, the names (name strings) of the matching nodes as well as, potentially, other metadata associated with the matching nodes. The typeahead process may then display a drop-down menu 300 that displays names of matching existing profile pages and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu 300. The user may then confirm the auto-populated declaration simply by keying "enter" on a keyboard or by clicking on the auto-populated declaration. Upon user confirmation of the matching nodes and edges, the typeahead process may transmit a request that informs the social-networking system 160 of the user's confirmation of a query containing the matching social-graph elements. In response to the request transmitted, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

In particular embodiments, in response to a structured query received from a querying user, the social-networking system 160 may generate one or more search results, where each search result matches (or substantially matches) the terms of the structured query. The social-networking system 160 may receive a structured query from a querying user. In response to the structured query, the social-networking system 160 may generate one or more search results corresponding to the structured query. Each search result may include link to a profile page and a description or summary of the profile page (or the node corresponding to that page). The search results may be presented and transmitted to the querying user as a search-results page. The structured query used to generate a particular search-results page is shown in query field 350, and the various search results generated in response to the structured query are illustrated in a field for presented search results. In particular embodiments, the query field 350 may also serve as the title bar for the page. In other words, the title bar and query field 350 may effectively be a unified field on the search-results page. The search-results page may also include a field for modifying search results and a field for providing suggested searches. When generating the search results, the social-networking system 160 may generate one or more snippets for each search result, where the snippets are contextual information about the target of the search result (i.e., contextual information about the social-graph entity, profile page, or other content corresponding to the particular search result). Although this disclosure describes and illustrates particular search-results pages, this disclosure contemplates any suitable search-results pages.

More information on generating search results may be found in U.S. patent application Ser. No. 13/731,939, filed 31 Dec. 2012, which is incorporated by reference.

Client-Side Search Templates

Figure 4:
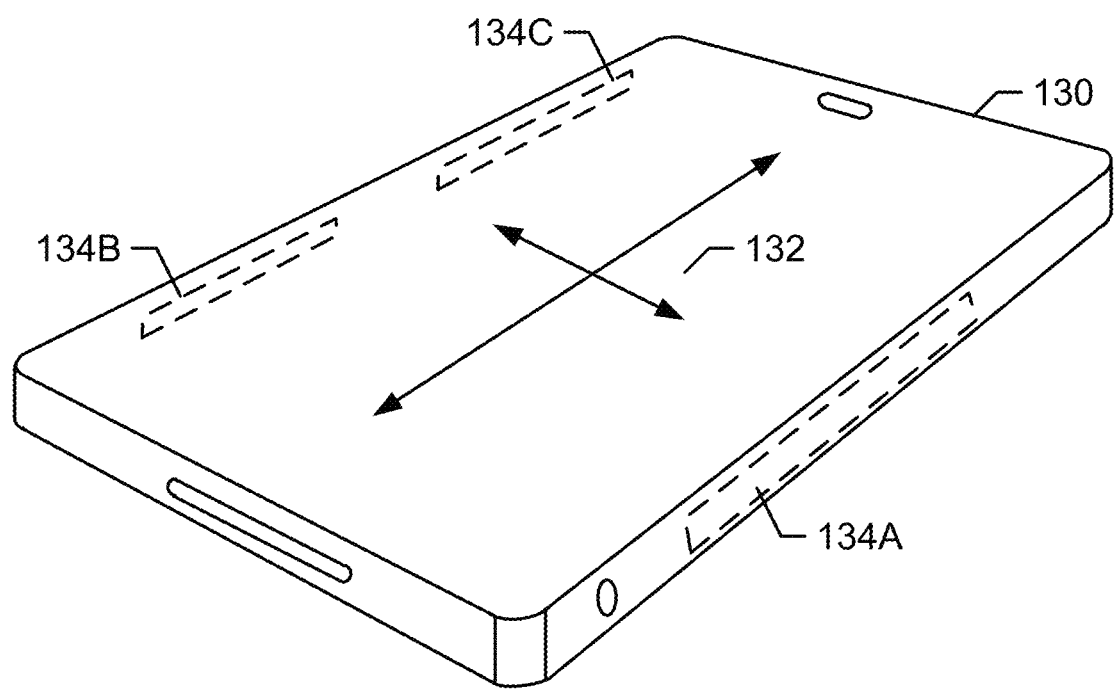
FIG. 4. illustrates an example mobile client system.

FIG. 4 illustrates an example mobile client system 130. This disclosure contemplates mobile client system 130 taking any suitable physical form. In particular embodiments, mobile client system 130 may be a computing system as described below. As example and not by way of limitation, mobile client system 130 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile client system 130 may have a touch sensor 132 as an input component. In the example of FIG. 4, touch sensor 132 is incorporated on a front surface of mobile client system 130. In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In the example of FIG. 4, one or more antennae 134A-B may be incorporated into one or more sides of mobile client system 130. Antennae 134A-B are components that convert electric current into radio waves, and vice versa.

During transmission of signals, a transmitter applies an oscillating radio frequency (RF) electric current to terminals of antenna 134A-B, and antenna 134A-B radiates the energy of the applied the current as electromagnetic (EM) waves. During reception of signals, antennae 134A-B convert the power of an incoming EM wave into a voltage at the terminals of antennae 134A-B. The voltage may be transmitted to a receiver for amplification.

In particular embodiments, mobile client system 130 many include a communication component coupled to antennae 134A-B for communicating with an Ethernet or other wire-based network or a wireless NIC (WNIC), wireless adapter for communicating with a wireless network, such as for example a WI-FI network or modem for communicating with a cellular network, such third generation mobile telecommunications (3G), or Long Term Evolution (LTE) network. This disclosure contemplates any suitable network and any suitable communication component 20 for it. As an example and not by way of limitation, mobile client system 130 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, mobile client system 130 may communicate with a wireless PAN (WPAN) (such as, for example, a BLUETOOTH WPAN), a WI-FI network, a WI-MAX network, a cellular telephone network (such as, for example, a Global System for Mobile Communications (GSM), 3G, or LTE network), or other suitable wireless network or a combination of two or more of these. Mobile client system 130 may include any suitable communication component for any of these networks, where appropriate.

Figure 5:
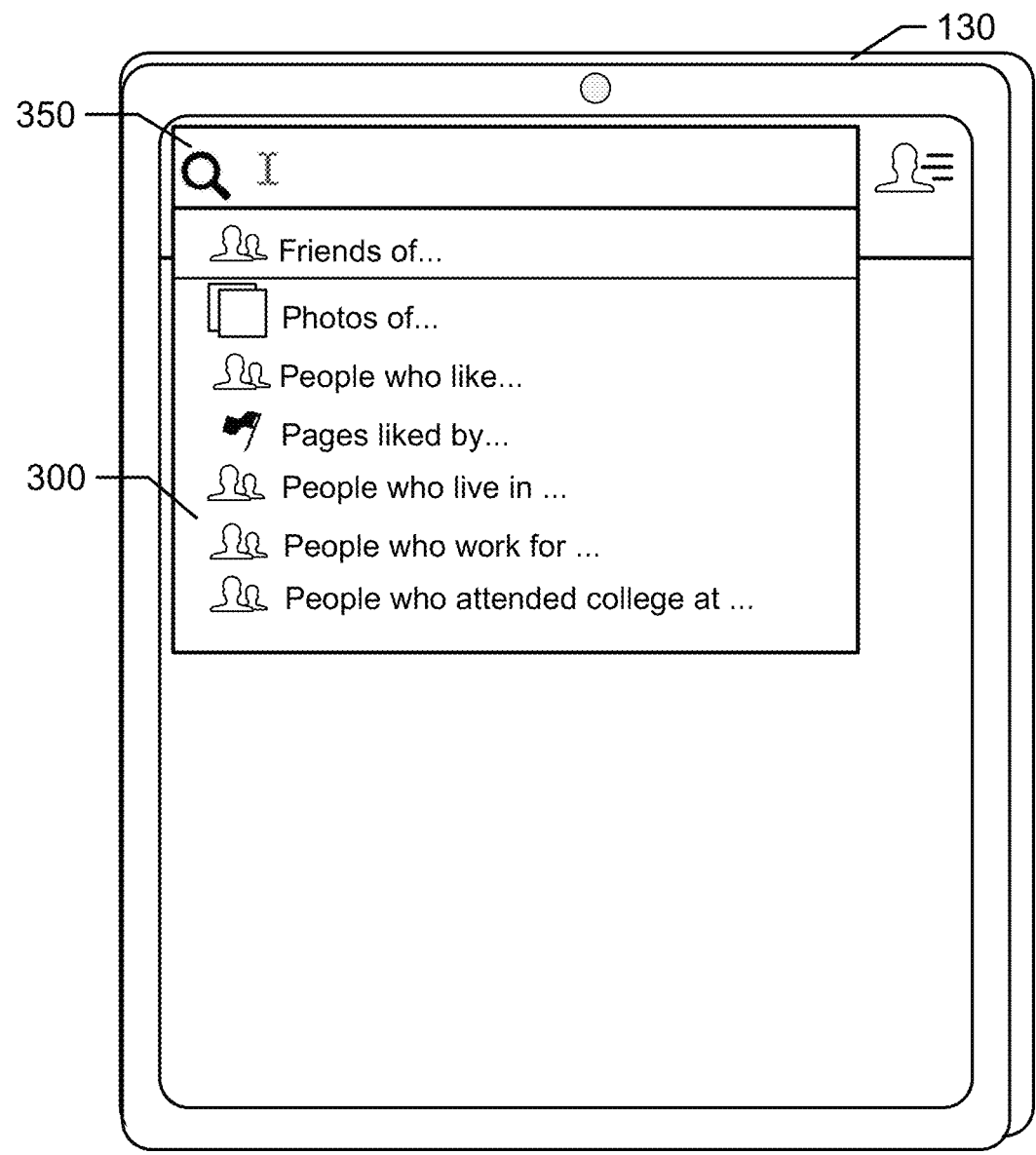
FIG. 5 illustrates an example user interface (UI) on an example mobile client system.

FIG. 5 illustrates an example UI of an example mobile client system. In particular embodiments, a user may submit a query to the social-network system 160 by inputting text into a search-query field 350 of the UI of mobile client system 130. As described above, a user of an online social network may search for information by providing a short phrase describing the subject matter, often referred to as a "search query," to a search engine. Furthermore, a user may input any character string into search-query field 350 to search for social-graph entities on the social-networking system 160 that matches the text query. The social-networking system 160 may then search a data store 164 (or, in particular, a social-graph database) to identify social-graph entities that match the query. As described below, mobile client system 130 may identify one or more structured queries based on the text input into search-query field 350 by the user. In particular embodiments, the identified structured queries may be displayed in drop-down menu 300. In particular embodiments, in a case where the text query is not matched to a pre-determined number of structured queries using grammar templates stored on mobile client system 130, the text query may be sent to social-networking system 160, where full context-free grammar models may be used to generate a suggested query based on a natural-language string generated by the grammar model.

In particular embodiments, in response to a text query received from a first user (i.e., the querying user), the mobile client system 130 may generate one or more structured queries rendered in a natural-language syntax, where each structured query includes query tokens that correspond to one or more identified social-graph elements. Structured queries may allow a querying user to search for content that is connected to particular users or concepts in the social graph 200 by particular edge types. As an example and not by way of limitation, the mobile client system 130 may receive an unstructured text query from a first user. In response, the mobile client system 130 (via, for example, a server-side element detection process) may access the social graph 200 and then parse the text query to identify social-graph elements that corresponded to n-grams from the text query. The mobile client system 130 may then access a grammar model, such as a context-free grammar model, which includes a plurality of grammar templates, described below. The identified social-graph elements may be used as terminal tokens ("query tokens") in the grammar templates. The selected grammar templates may then be used to generate one or more structured queries that include the query tokens referencing the identified social-graph elements. These structured queries may be based on strings generated by the grammar templates, such that they are rendered with references to the appropriate social-graph elements using a natural-language syntax. The structured queries may be displayed in a drop-down menu 300 (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. By using this process, the output of the natural-language rendering process may be efficiently parsed, for example, to generate modified or alternative structured queries. Furthermore, since the rules used by this process are derived from the grammar model, any modification to the rules of the grammar model can be immediately reflected in the rendering process. Although this disclosure describes and illustrates generating particular structured queries in a particular manner, this disclosure contemplates generating any suitable structured queries in any suitable manner.

In particular embodiments, the mobile client system 130 may receive from a querying/first user (corresponding to a first user node 202) an unstructured text query. As an example and not by way of limitation, a first user may want to search for other users who: (1) are first-degree friends of the first user; and (2) are associated with Stanford University (i.e., the user nodes 202 are connected by an edge 206 to the concept node 204 corresponding to the school "Stanford"). The first user may then enter a text query "friends stanford" into search-query field 350. As used herein, reference to an unstructured text query may refer to a simple text string inputted by a user. The text query may, of course, be structured with respect to standard language/grammar rules (e.g. English language grammar). However, the text query will ordinarily be unstructured with respect to social-graph elements. In other words, a simple text query will not ordinarily include embedded references to particular social-graph elements. Thus, as used herein, a structured query refers to a query that contains references to particular social-graph elements, allowing the search engine to search based on the identified elements. Furthermore, the text query may be unstructured with respect to formal query syntax. In other words, a simple text query will not necessarily be in the format of a query command that is directly executable by a search engine. Although this disclosure describes receiving particular queries in a particular manner, this disclosure contemplates receiving any suitable queries in any suitable manner.

In particular embodiments, mobile client system 130 may parse the unstructured text query (also simply referred to as a search query) received from the first user (i.e., the querying user) to identify one or more n-grams. In general, an n-gram is a contiguous sequence of n items from a given sequence of text or speech. The items may be characters, phonemes, syllables, letters, words, base pairs, prefixes, or other identifiable items from the sequence of text or speech. The n-gram may comprise one or more characters of text (letters, numbers, punctuation, etc.) entered by the querying user. An n-gram of size one can be referred to as a "unigram," of size two can be referred to as a "bigram" or "digram," of size three can be referred to as a "trigram," and so on. Each n-gram may include one or more parts from the text query received from the querying user. In particular embodiments, each n-gram may comprise a character string (e.g., one or more characters of text) entered by the first user. As an example and not by way of limitation, the mobile client system 130 may parse the text query "friends stanford" to identify the following n-grams: friends; stanford; friends stanford. As another example and not by way of limitation, the mobile client system 130 may parse the text query "friends in palo alto" to identify the following n-grams: friends; in; palo; alto; friends in; in palo; palo alto; friend in palo; in palo alto; friends in palo alto. In particular embodiments, each n-gram may comprise a contiguous sequence of n items from the text query. Although this disclosure describes parsing particular queries in a particular manner, this disclosure contemplates parsing any suitable queries in any suitable manner.

In particular embodiments, mobile client system 130 may determine or calculate, for each n-gram identified in the text query, a score to determine whether the n-gram corresponds to a social-graph element. The score may be, for example, a confidence score, a probability, a quality, a ranking, another suitable type of score, or any combination thereof. As an example and not by way of limitation, the mobile client system 130 may determine a probability score (also referred to simply as a "probability") that the n-gram corresponds to a social-graph element, such as a user node 202, a concept node 204, or an edge 206 of social graph 200. The probability score may indicate the level of similarity or relevance between the n-gram and a particular social-graph element. There may be many different ways to calculate the probability. The present disclosure contemplates any suitable method to calculate a probability score for an n-gram identified in a search query. In particular embodiments, the mobile client system 130 may determine a probability, p, that an n-gram corresponds to a particular social-graph element. The probability, p, may be calculated as the probability of corresponding to a particular social-graph element, k, given a particular search query, X. In other words, the probability may be calculated as p=(k|X). As an example and not by way of limitation, a probability that an n-gram corresponds to a social-graph element may calculated as an probability score denoted as $p_{i,j,k}$. The input may be a text query X=($x_1, x_2, \ldots, x_N$), and a set of classes. For each (i:j) and a class k, the mobile client system 130 may compute $p_{i,j,k}$=p(class($x_{i:j}$)=k|X). As an example and not by way of limitation, the n-gram "stanford" could be scored with respect to the following social-graph elements as follows: school "Stanford University"=0.7; location "Stanford, Calif."=0.2; user "Allen Stanford"=0.1. As another example and not by way of limitation, the n-gram "friends" could be scored with respect to the following social-graph elements as follows: user "friends"=0.9; television show "Friends"=0.1. In particular embodiments, the mobile client system 130 may use a forward-backward algorithm to determine the probability that a particular n-gram corresponds to a particular social-graph element. For a given n-gram within a text query, the mobile client system 130 may use both the preceding and succeeding n-grams to determine which particular social-graph elements correspond to the given n-gram. In particular embodiments, the identified social-graph elements may be used to generate a query command that is executable by a search engine. The query command may be a structured semantic query with defined functions that accept specific arguments. As an example and not by way of limitation, the text query "friend me mark" could be parsed to form the query command: intersect(friend(me), friend(Mark)). In other words, the query is looking for nodes in the social graph that intersect the querying user ("me") and the user "Mark" (i.e., those user nodes 202 that are connected to both the user node 202 of the querying user by a friend-type edge 206 and the user node 202 for the user "Mark" by a friend-type edge 206). Although this disclosure describes determining whether n-grams correspond to social-graph elements in a particular manner, this disclosure contemplates determining whether n-grams correspond to social-graph elements in any suitable manner. Moreover, although this disclosure describes determining whether an n-gram corresponds to a social-graph element using a particular type of score, this disclosure contemplates determining whether an n-gram corresponds to a social-graph element using any suitable type of score.

In particular embodiments, mobile client system 130 may identify one or more edges 206 having a probability greater than an edge-threshold probability. Each of the identified edges 206 may correspond to at least one of the n-grams. As an example and not by way of limitation, the n-gram may only be identified as corresponding to an edge, k, if $p_{i,j,k} > p_{edge-threshold}$. Furthermore, each of the identified edges 206 may be connected to at least one of the identified nodes. In other words, the mobile client system 130 may only identify edges 206 or edge-types that are connected to user nodes 202 or concept nodes 204 that have previously been identified as corresponding to a particular n-gram. Edges 206 or edge-types that are not connected to any previously identified node are typically unlikely to correspond to a particular n-gram in a search query. By filtering out or ignoring these edges 206 and edge-types, the mobile client system 130 may more efficiently search the social graph 200 for relevant social-graph elements. As an example and not by way of limitation, referencing FIG. 2, for a text query containing "went to Stanford," where an identified concept node 204 is the school "Stanford," the mobile client system 130 may identify the edges 206 corresponding to "worked at" and the edges 206 corresponding to "attended," both of which are connected to the concept node 204 for "Stanford." Thus, the n-gram "went to" may be identified as corresponding to these edges 206. However, for the same text query, the mobile client system 130 may not identify the edges 206 corresponding to "like" or "fan" in the social graph 200 because the "Stanford" node does not have any such edges connected to it. Although this disclosure describes identifying edges 206 that correspond to n-grams in a particular manner, this disclosure contemplates identifying edges 206 that correspond to n-grams in any suitable manner.

In particular embodiments, mobile client system 130 may identify one or more user nodes 202 or concept nodes 204 having a probability greater than a node-threshold probability. Each of the identified nodes may correspond to at least one of the n-grams. As an example and not by way of limitation, the n-gram may only be identified as corresponding to a node, k, if $p_{i,j,k} > p_{node\text{-}threshold}$. Furthermore, each of the identified user nodes 202 or concept nodes 204 may be connected to at least one of the identified edges 206. In other words, the mobile client system 130 may only identify nodes or nodes-types that are connected to edges 206 that have previously been identified as corresponding to a particular n-gram. Nodes or node-types that are not connected to any previously identified edges 206 are typically unlikely to correspond to a particular n-gram in a search query. By filtering out or ignoring these nodes and node-types, the mobile client system 130 may more efficiently search the social graph 200 for relevant social-graph elements. As an example and not by way of limitation, for a text query containing "worked at Apple," where an identified edge 206 is "worked at," the mobile client system 130 may identify the concept node 204 corresponding to the company APPLE, INC., which may have multiple edges 206 of "worked at" connected to it. However, for the same text query, the mobile client system 130 may not identify the concept node 204 corresponding to the fruit-type "apple," which may have multiple "like" or "fan" edges connected to it, but no "worked at" edge connections. In particular embodiments, the node-threshold probability may differ for user nodes 202 and concept nodes 204, and may differ even among these nodes (e.g., some concept nodes 204 may have different node-threshold probabilities than other concept nodes 204). As an example and not by way of limitation, an n-gram may be identified as corresponding to a user node 302, $k_{user}$, if $p_{i,j,k} > p_{user\text{-}node\text{-}threshold}$, while an n-gram may be identified as corresponding to a concept node 304, $k_{concept}$, if $p_{i,j,k} > p_{concept\text{-}node\text{-}threshold}$. In particular embodiments, the mobile client system 130 may only identify nodes that are within a threshold degree of separation of the user node 202 corresponding to the first user (i.e., the querying user). The threshold degree of separation may be, for example, one, two, three, or all. Although this disclosure describes identifying nodes that correspond to n-grams in a particular manner, this disclosure contemplates identifying nodes that correspond to n-grams in any suitable manner.

In particular embodiments, the mobile client system 130 may access a plurality of grammar templates. Each grammar template may comprise one or more non-terminal tokens (or "non-terminal symbols") and one or more terminal tokens (or "terminal symbols"/"query tokens"), where particular non-terminal tokens may be replaced by terminal tokens. A grammar model is a set of formation rules for strings in a formal language. Although this disclosure describes accessing particular grammar templates, this disclosure contemplates any suitable grammars.

In particular embodiments, the mobile client system 130 may generate one or more strings using one or more grammar templates. The non-terminal symbols may be replaced with terminal symbols (i.e., terminal tokens or query tokens). Some of the query tokens may correspond to identified nodes or identified edges, as described previously. A string generated by the grammar template may then be used as the basis for a structured query containing references to the identified nodes or identified edges. The string generated by the grammar may be rendered in a natural-language syntax, such that a structured query based on the string is also rendered in natural language. A context-free grammar is a grammar in which the left-hand side of each production rule consists of only a single non-terminal symbol. A probabilistic context-free grammar is a tuple $\langle \Sigma, N, S, P \rangle$, where the disjoint sets $\Sigma$ and N specify the terminal and non-terminal symbols, respectively, with $S \in N$ being the start symbol. P is the set of productions, which take the form $E \rightarrow \xi(p)$, with $E \in N$, $\xi \in (\Sigma \cup N)^+$, and $p = Pr(E \rightarrow \xi)$, the probability that E will be expanded into the string $\xi$. The sum of probabilities p over all expansions of a given non-terminal E must be one. Although this disclosure describes generating strings in a particular manner, this disclosure contemplates generating strings in any suitable manner.

In particular embodiments, the mobile client system 130 may identify one or more query tokens corresponding to the previously identified nodes and edges. In other words, if an identified node or identified edge may be used as a query token in a particular grammar template, that query token may be identified by the mobile client system 130. As an example and not by way of limitation, an example grammar template may be: [user][user-filter][school]. The non-terminal tokens [user], [user-filter], and [school] could then be determined based n-grams in the received text query. For the text query "friends stanford", this query could be parsed by using the grammar template as, for example, "[friends][who go to][Stanford University]" or "[friends][who work at][Stanford University]". As another example and not by way of limitation, an example grammar template may be [user][user-filter][location]. For the text query "friends stanford", this query could be parsed by using the grammar template, for example, "[friends][who live in][Stanford, Calif.]". In both the example cases above, if the n-grams of the received text query could be used as query tokens, then these query tokens may be identified by the mobile client system 130. Although this disclosure describes identifying particular query tokens in a particular manner, this disclosure contemplates identifying any suitable query tokens in any suitable manner.

In particular embodiments, when the user inputs one or more text characters in search-query field 350, a program or application executed on mobile client system 130 may match the text characters against grammar templates preloaded on mobile client system 130. As described below, mobile client system 130 may then search a data store of mobile client system 130 to access grammar templates to determine one or more matches the query. As an example and not by way of limitation, the application executed on mobile client system 130 may perform the matching of the inputted text characters to the grammar templates after each keystroke. As another example, the inputted text may be parsed into one or more n-grams, described above. In particular embodiments, the matching may be part of a client-side typeahead process. In particular embodiments, mobile client system 130 may identify one or more structured queries based at least in part on matching input text to one or more grammar templates or data identifying social-graph entities that are stored on mobile client system 130.

In particular embodiments, the mobile client system 130 may select one or more grammar templates having at least one query token corresponding to each of the previously identified nodes and edges. Only particular grammar templates may be used depending on the n-grams identified in the text query. So the terminal tokens of all available grammar templates should be examined to find those that match the identified n-grams from the text query. In other words, if a particular grammar template can use all of the identified nodes and edges as query tokens, that grammar template may be selected by the mobile client system 130 as a possible grammar template to use for generating a structured query. This is effectively a type of bottom-up parsing, where the possible query tokens are used to determine the applicable grammar template to apply to the query. As an example and not by way of limitation, for the text query "friends stanford", mobile client system 130 may identify the query tokens of [friends] and [Stanford University]. Terminal tokens of the grammar templates may be identified, as previously discussed. Any grammar template that is able to use both the [friends] and the [Stanford University] tokens may then be selected. For example, the grammar template [user][user-filter][school] may be selected because this grammar template could use the [friends] and the [Stanford University] tokens as query tokens, such as by forming the strings "friends who go to Stanford University" or "friends who work at Stanford University". Thus, if the n-grams of the received text query could be used as query tokens in the grammar templates, then these grammar templates may be selected by the mobile client system 130. Similarly, if the received text query comprises n-grams that could not be used as query tokens in the grammar, that grammar may not be selected. Although this disclosure describes selecting particular grammar templates in a particular manner, this disclosure contemplates selecting any suitable grammar templates in any suitable manner.

In particular embodiments, the mobile client system 130 may determine a score for each selected grammar template. The score may be, for example, a confidence score, a probability, a quality, a ranking, another suitable type of score, or any combination thereof. The score may be based on the individual scores or probabilities associated with the query tokens used in the selected grammar. A grammar may have a higher relative score if it uses query tokens with relatively higher individual scores. As an example and not by way of limitation, continuing with the prior examples, the n-gram "stanford" could be scored with respect to the following social-graph elements as follows: school "Stanford University"=0.7; location "Stanford, Calif."=0.2; user "Allen Stanford"=0.1. The n-gram "friends" could be scored with respect to the following social-graph elements as follows: user "friends"=0.9; television show "Friends"=0.1. Thus, the grammar template [user][user-filter][school] may have a relatively high score if it uses the query tokens for the user "friends" and the school "Stanford University" (generating, for example, the string "friends who go to Stanford University"), both of which have relatively high individual scores. In contrast, the grammar [user][user-filter][user] may have relatively low score if it uses the query tokens for the user "friends" and the user "Allen Stanford" (generating, for example, the string "friends of Allen Stanford"), since the latter query token has a relatively low individual score. Although this disclosure describes determining particular scores for particular grammars in a particular manner, this disclosure contemplates determining any suitable scores for any suitable grammars in any suitable manner.

In particular embodiments, the mobile client system 130 may determine the score for a selected grammar template based on the relevance of the social-graph elements corresponding to the query tokens of the grammar template to the querying user (i.e., the first user, corresponding to a first user node 202). User nodes 202 and concept nodes 204 that are connected to the first user node 202 directly by an edge 206 may be considered relevant to the first user. Thus, grammar templates comprising query tokens corresponding to these relevant nodes and edges may be considered more relevant to the querying user. As an example and not by way of limitation, a concept node 204 connected by an edge 206 to a first user node 202 may be considered relevant to the first user node 202. As used herein, when referencing a social graph 200 the term "connected" means a path exists within the social graph 200 between two nodes, wherein the path may comprise one or more edges 206 and zero or more intermediary nodes. In particular embodiments, nodes that are connected to the first user node 202 via one or more intervening nodes (and therefore two or more edges 206) may also be considered relevant to the first user. Furthermore, in particular embodiments, the closer the second node is to the first user node, the more relevant the second node may be considered to the first user node. That is, the fewer edges 206 separating the first user node 202 from a particular user node 202 or concept node 204 (i.e., the fewer degrees of separation), the more relevant that user node 202 or concept node 204 may be considered to the first user. As an example and not by way of limitation, as illustrated in FIG. 2, the concept node 204 corresponding to the school "Stanford" is connected to the user node 202 corresponding to User "C," and thus the concept "Stanford" may be considered relevant to User "C." As another example and not by way of limitation, the user node 202 corresponding to User "A" is connected to the user node 202 corresponding to User "C" via one intermediate node and two edges 206 (i.e., the intermediated user node 202 corresponding to User "B"), and thus User "A" may be considered relevant to User "C," but because the user node 202 for User "A" is a second-degree connection with respect to User "C," that particular concept node 204 may be considered less relevant than a user node 202 that is connected to the user node for User "C" by a single edge 206, such as, for example, the user node 202 corresponding to User "B." As yet another example and not by way of limitation, the concept node for "Online Poker" (which may correspond to an online multiplayer game) is not connected to the user node for User "C" by any pathway in social graph 200, and thus the concept "Online Poker" may not be considered relevant to User "C." In particular embodiments, a second node may only be considered relevant to the first user if the second node is within a threshold degree of separation of the first user node 202. As an example and not by way of limitation, if the threshold degree of separation is three, then the user node 202 corresponding to User "D" may be considered relevant to the concept node 204 corresponding to the recipe "Chicken Parmesan," which are within three degrees of each other on social graph 200 illustrated in FIG. 2. However, continuing with this example, the concept node 204 corresponding to the application "All About Recipes" would not be considered relevant to the user node 202 corresponding to User "D" because these nodes are four degrees apart in the social graph 200. Although this disclosure describes determining whether particular social-graph elements (and thus their corresponding query tokens) are relevant to each other in a particular manner, this disclosure contemplates determining whether any suitable social-graph elements are relevant to each other in any suitable manner. Moreover, although this disclosure describes determining whether particular query tokens corresponding to user nodes 202 and concept nodes 204 are relevant to a querying user, this disclosure contemplates similarly determining whether any suitable query token (and thus any suitable node) is relevant to any other suitable user.

In particular embodiments, the mobile client system 130 may determine the score for a selected grammar template based social-graph information corresponding to the query tokens of the grammar. As an example and not by way of limitation, when determining a probability, p, that an n-gram corresponds to a particular social-graph element, the calculation of the probability may also factor in social-graph information. Thus, the probability of corresponding to a particular social-graph element, k, given a particular search query, X, and social-graph information, G, may be calculated as $p=(k|X, G)$. The individual probabilities for the identified nodes and edges may then be used to determine the score for a grammar template using those social-graph elements as query tokens. In particular embodiments, the score for a selected grammar may be based on the degree of separation between the first user node 202 and the particular social-graph element used as a query token in the grammar template. Grammar templates with query tokens corresponding to social-graph elements that are closer in the social graph 200 to the querying user (i.e., fewer degrees of separation between the element and the first user node 202) may be scored more highly than grammars using query tokens corresponding to social-graph elements that are further from the user (i.e., more degrees of separation). As an example and not by way of limitation, referencing FIG. 2, if user "B" inputs a text query of "chicken," a grammar with a query token corresponding to the concept node 204 for the recipe "Chicken Parmesan," which is connected to user "B" by an edge 206, may have a relatively higher score than a grammar template with a query token corresponding to other nodes associated with the n-gram chicken (e.g., concept nodes 204 corresponding to "chicken nuggets," or "funky chicken dance") that are not connected to user "B" in the social graph 200. In particular embodiments, the score for a selected grammar template may be based on the identified edges 206 corresponding to the query tokens of the grammar template. If the mobile client system 130 has already identified one or more edges that correspond to n-grams in a received text query, those identified edges may then be considered when determining the score for a particular parsing of the text query by the grammar template. If a particular grammar template comprises query tokens that correspond to both identified nodes and identified edges, if the identified nodes are not actually connected to any of the identified edges, that particular grammar template may be assigned a zero or null score. In particular embodiments, the score for a selected grammar template may be based on the number of edges 206 connected to the nodes corresponding to query tokens of the grammar template. Grammar templates comprising query tokens that corresponding to nodes with more connecting edges 206 may be more popular and more likely to be a target of a search query. As an example and not by way of limitation, if the concept node 204 for "Stanford, Calif." is only connected by five edges while the concept node 204 for "Stanford University" is connected by five-thousand edges, when determining the score for grammars containing query tokens corresponding to either of these nodes, the mobile client system 130 may determine that the grammar template with a query token corresponding to the concept node 204 for "Stanford University" has a relatively higher score than a grammar template referencing the concept node 204 for "Stanford, Calif." because of the greater number of edges connected to the former concept node 204. In particular embodiments, the score for a selected grammar may be based on the search history associate with the first user (i.e., the querying user). Grammar templates with query tokens corresponding to nodes that the first user has previously accessed, or are relevant to the nodes the first user has previously accessed, may be more likely to be the target of the first user's search query. Thus, these grammar templates may be given a higher score. As an example and not by way of limitation, if first user has previously visited the "Stanford University" profile page but has never visited the "Stanford, Calif." profile page, when determining the score for grammar templates with query tokens corresponding to these concepts, the mobile client system 130 may determine that the concept node 204 for "Stanford University" has a relatively high score, and thus the grammar template using the corresponding query token, because the querying user has previously accessed the concept node 204 for the school. As another example and not by way of limitation, if the first user has previously visited the concept-profile page for the television show "Friends," when determining the score for the grammar template with the query token corresponding to that concept, the mobile client system 130 may determine that the concept node 204 corresponding to the television show "Friends" has a relatively high score, and thus the grammar template using the corresponding query token, because the querying user has previously accessed the concept node 204 for that television show. Although this disclosure describes determining scores for particular grammar templates based on particular social-graph information in a particular manner, this disclosure contemplates determining scores for any suitable grammar templates based on any suitable social-graph information in any suitable manner.

Figure 6:
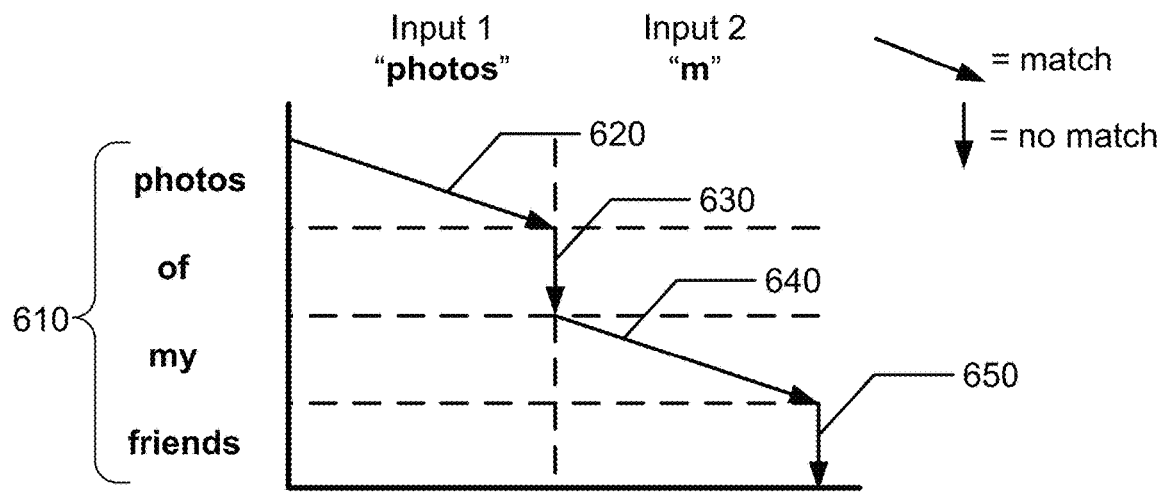
FIG. 6 illustrates an graphical representation of an example cost calculation for matching a text input to a grammar template and social-graph entities.
Figure 7:
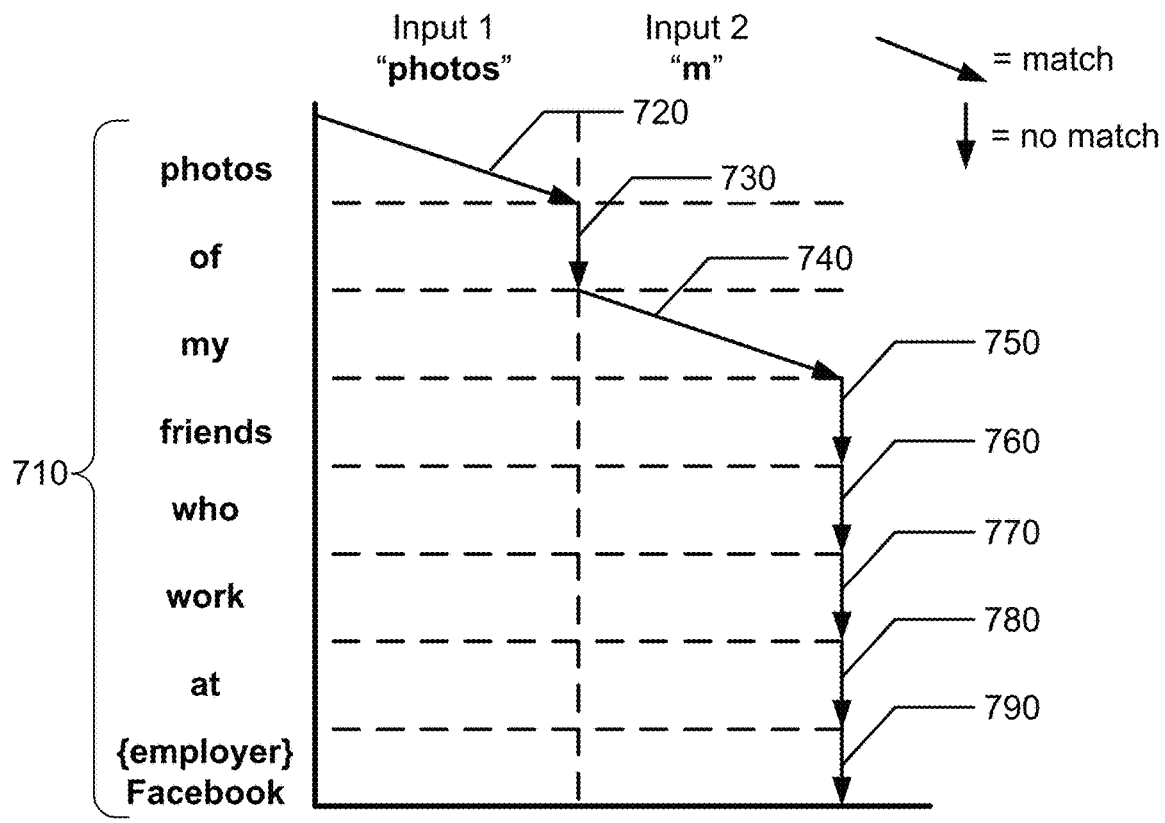
FIG. 7 illustrates an graphical representation of an example cost calculation for matching a text input to a grammar template and social-graph entities.
Figure 8:
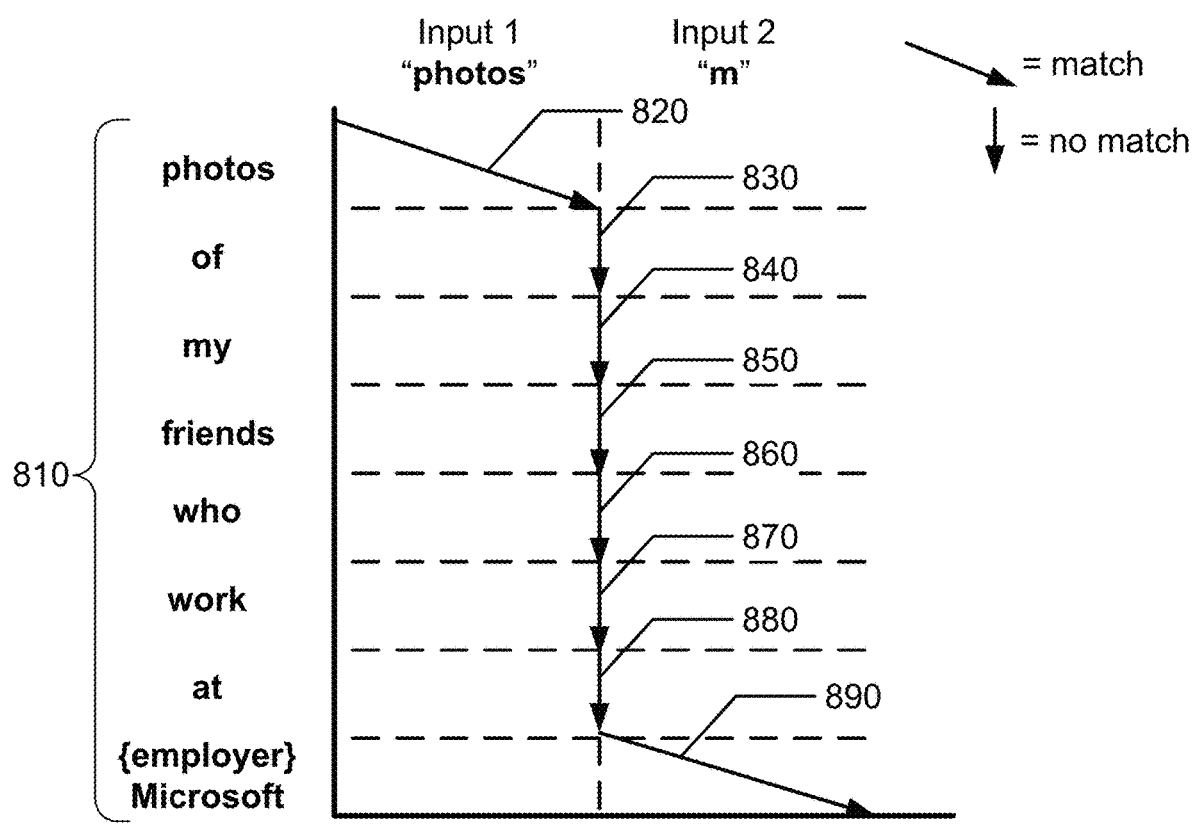
FIG. 8 illustrates an graphical representation of an example cost calculation for matching a text input to a grammar template and social-graph entities.

FIGS. 6-8 illustrate graphical representations of example cost calculations for matching text inputs to grammar templates and social-graph entities. In particular embodiments, mobile client system 130 may generate one or more structured queries based on selecting one or more grammar templates or stored social-graph entities. Herein, reference to a query or terminal token may refer to one or more identified social-graph elements. Herein, reference to a non-terminal token may refer to a token of a structured query that may be matched to one or more social-graph entities. In particular embodiments, one or more grammar templates may be based on a natural-language string and stored in a data store of mobile client system 130. A type of each stored social-graph entity may be used to determine the relevance of the stored social-graph entity to a particular non-terminal token of one or more grammar templates. In particular embodiments, the mobile client system 130 may select one or more grammar templates based at least in part on calculating a cost for each grammar template in relation to the n-grams identified in the text query. As described above, a grammar template may include one or more non-terminal tokens and one or more terminal tokens (also referred to as query tokens). For example, for a grammar template "Photos of [user] in [city]", the non-terminal tokens are [user] and [city], while the query tokens are "Photos of" and "in". The non-terminal tokens may be matched to social-graph entities, and references to those matching entities may be inserted into the grammar template in order to form a completed structured query (e.g., "Photos of Justin in San Francisco"). In particular embodiments, n-grams that are matched as a query token to a non-terminal token may not incur the associated insertion cost in the cost calculation. As an example and not by way of limitation, the n-gram "m" may be matched to query token [my] based at least in part on at a partial character matching of the character "m" in n-gram "m" to query token [my]. Otherwise, when a particular non-terminal token of the grammar templates does not match any of the text characters, the insertion cost associated with the particular non-terminal token in the cost calculation is incurred. In particular embodiments, a predetermined number of social-graph entities may be stored on mobile client system 130 and each stored social-graph entity may correspond to a query token of one or more of the grammar templates. Furthermore, storing the social-graph entities on mobile client system 130 may include data identifying the social-graph (e.g. a text string or title describing the social-graph entity), data uniquely identifying the social-graph entity to a particular system (e.g. an identification number or string), a type associated with the social-graph entity (e.g. users or event), or any combination thereof. For example, data identifying the social-graph entity to the particular system may include an identification character string or a link referencing the social-graph entity. Although this disclosure describes generating structured queries in a particular manner, this disclosure contemplates generating structured queries in any suitable manner.

In particular embodiments, the social-graph entities stored on mobile client system 130 may be determined by pre-selecting particular types of social-graph entities (e.g. popular entities). As an example, the social-graph entities of each user stored on mobile client system 130 may correspond to friends of the user, pages of the user, groups of the user, events of the user, applications installed by the user on mobile client system 130, or any combination thereof. For example, pages of the user may include entities associated with the user, such as for example the hometown, alma mater, employer, etc. of the user. In particular embodiments, the pre-determined number of social-graph entities may be first-degree social-graph entities (e.g. concept nodes 204 or user nodes 202 connected to the user node 202 of the user by an edge 206) or high coefficient entities of each user.

In particular embodiments, the grammar templates may be based on a natural-language string, such as for example, "friends of [user]" or "friends who live near [city]". One or more grammar templates stored in a data store of mobile client system 130 may be identified/constructed based at least in part on an analysis of search queries performed on social-networking system 160 (e.g. through deconstruction of popular Graph Search queries). As an example and not by way of limitation, a log of search queries on social-networking system 160 may be analyzed to identify a pre-determined number of the most popular search queries. As another example, a ranking of the identified search queries may be personalized for each user based at least in part on a search query history of each user. In particular embodiments, the identified search queries may be converted into grammar templates as natural-language strings without one or more social-graph entities associated with the search queries, which may instead by substituted with non-terminal tokens in the grammar template.

In particular embodiments, the type of each stored social-graph entity may be used to determine the relevance of the stored social-graph entity to a particular non-terminal token of one or more grammar templates. As an example and not by way of limitation, the type of stored social-graph entity relevant to grammar template "photos of [user]" may be a type that corresponds to friends of the user. As another example, the type of social-graph entity relevant to a non-terminal token [location] may be a type that corresponds to pages (e.g. hometown) of the user. Furthermore, the grammar templates and data associated with social-graph entities may be sent to and pre-loaded on mobile client system 130 prior to the user inputting text in search-query field 350. In particular embodiments, the pre-defined grammar templates and social-graph entities for each user may be re-evaluated and updated by social-networking system 160 at pre-determined intervals (e.g. once a week). As an example and not by way of limitation, social-networking system 160 may send the updated grammar templates or data identifying the social-graph entities at the pre-determined intervals to mobile client system 130.

In particular embodiments, a client-side typeahead process of mobile client system 130 may identify one or more structured queries matching the text input based at least in part on calculating a cost associated with each stored grammar template. As an example and not by way of limitation, each stored grammar template may have a base cost. Furthermore, the base cost of each stored grammar template may be inversely proportional to the popularity of the search query that is the basis of each pre-defined grammar templates. In other words, grammar templates derived from more popular search queries may have a lower associated base cost. In particular embodiments, each non-terminal token of each grammar template may have an associated insertion cost. As an example and not by way of limitation, the insertion cost of each non-terminal token may be related to an amount of differentiation provided by the particular non-terminal token to the associated pre-defined grammar template. For example, for a grammar template "photos of my friends," the terminal token that corresponds to "friends" may have a higher insertion cost while the tokens that correspond to "of" or "my" that may be considered to be more generic and have less of a contribution to identifying particular grammar templates. In particular embodiments, n-grams that are matched as a query token to a non-terminal token may not incur the associated insertion cost in the cost calculation. However, when a particular non-terminal token of the grammar templates does not match any of the text characters, the insertion cost associated with the particular non-terminal token in the cost calculation is incurred. In particular embodiments, one or more the social-graph entities associated with particular non-terminal tokens may each have an associated insertion cost.

As an example and not by way of limitation, text input "photo m" in search-query field 350 may be partitioned into n-grams "photo" and "m," and matched to grammar templates "photos of my friends" and "photos of my friends who work at [employer]," where [employer] is a non-terminal token that may associated with one or more of the stored social-graph entities, as described below. Furthermore, one or more social-graph entities may be identified as being relevant to non-terminal tokens based on the type of the social-graph entity. As described above, the client-side typeahead process may parse text input "photo m" into a n-grams "photo" and "m." As illustrated in the example of FIG. 6, grammar template 610 "photos of my friends" may be evaluated with respect to n-grams "photo" and "m." As an example and not by way of limitation, the pre-defined grammar template 610 "photos of my friends" when completely matched may have query tokens [photos], [of], [my], and [friends] or otherwise incur an insertion cost, as described above. Initially, n-gram "photo" may be matched as a query token [photo] of grammar template 610 that corresponds to a stored social-graph entity and incurs no cost in the cost calculation, as illustrated by 620. The modified typeahead process on the mobile client system 130 may evaluate the remaining non-terminal tokens of grammar template 610 to the remainder of the inputted text characters. As illustrated by 630, the n-gram "m" does not match query token [of]. As a result, the cost calculation incurs the insertion cost associated with not matching the query token [of]. As illustrated by 640, the n-gram "m" may be matched as a query token [my] and as a result does not incur any insertion cost. As an example and not by way of limitation, n-gram "m" may be matched to query token [my] based at least in part on at a partial character matching of the character "m" in n-gram "m" to query token [my]. Although this disclosure describes determining a match between particular n-grams and particular query tokens based on particular criterion, this disclosure contemplates determining a match between any suitable n-grams and any suitable query token based on any suitable criteria such as for example, a confidence score, a probability, a quality, a ranking, or any combination thereof. Since there are no remaining text characters, the insertion cost associated with the unmatched query token [friends] is incurred, as illustrated by 650. Assuming, the base cost of grammar template 610 "photos of my friends" is 1.1 and the insertion costs of the unmatched query tokens "photos," "of," "my," "friends" are 2.2, 0.5, 0, and 1.5 respectively, the calculated cost is 3.1 for structured search query "photos of my friends."

As illustrated in the example of FIG. 7, a grammar template 710 "photos of my friends who work at [employer]" may be evaluated with respect to inputted text "photo m." As an example and not by way of limitation, grammar template 710 when completely matched may have query tokens [photos], [of], [my], [friends], [who], [work], [at] and non-terminal token [employer] that is evaluated with the social-graph entity "Facebook" that corresponds to the lowest cost stored social-graph entity of type "employer." Initially, the n-gram "photo" may be matched as a query token [photo] of grammar template 710 and incurs no cost in the cost calculation, as illustrated by 720. The remaining non-terminal tokens of the pre-defined grammar template may be evaluated against the remaining n-gram. As illustrated by 730, the n-gram "m" does not match as a query token [of]. As a result, the cost calculation incurs the insertion cost associated with the n-gram not matching to query token [of]. As illustrated by 740, the n-gram "m" matches as a query token [my] and as a result does not incur any insertion cost. As described above, n-gram "m" may be matched to query token [my] based at least in part on at a partial character matching of the character "m" in n-gram "m" to query token [my]. Since there are no remaining text characters, the insertion cost associated with not matching query token [friends], [who], [work], and [at] are incurred, as illustrated by 750-790. Assuming, the base cost of grammar template 710 "photos of my friends who work at [employer]" is 2.1 and the insertion costs of the non-terminal tokens when not matched as query tokens [photos] [of] [my] [friends] [who], [work], [at], and [employer] are 2.2, 0.5, 0, 1.5, 0.1, 0.3, 0.5, and 1.0, respectively. And assuming the insertion cost of social-graph entity "Facebook" is 0.03, the resultant calculated cost is 6.03 for structured search query "photos of my friends who work at Facebook."

As illustrated in the example of FIG. 8, a grammar template 810 "photos of my friends who work at [employer]" with social-graph entity "Microsoft" may be evaluated with respect to inputted text "photo m." As described above, the n-gram "photo" may be matched as a query token [photo] of grammar template 810 and incurs no cost in the cost calculation, as illustrated by 820. The remaining non-terminal tokens of the pre-defined grammar template may be evaluated against the remaining n-gram. As illustrated by 830, the n-gram "m" does not match as a query token [of]. As a result, the cost calculation incurs the insertion cost associated with not matching query token [of]. In particular embodiments, when the client-side typeahead process matches more than one query token, the client-side typeahead process may match the n-gram to the higher insertion cost query token. As an example and not by way of limitation, assuming non-terminal token [employer], social-graph entity "Microsoft," and query token [my] when unmatched have insertion costs of 1.0, 0.04, and 0, respectively, the client-side typeahead process may match the n-gram "m" to non-terminal token [employer] and the social-graph entity "Microsoft" while not matching as query token [my], as illustrated by 840 and 890. As an example and not by way of limitation, n-gram "m" may be matched to non-terminal token [employer] evaluated with social-graph entity "Microsoft" based at least in part on at a partial character matching of the character "m" in n-gram "m" to social-graph entity "Microsoft." Furthermore, [employer] evaluated with social-graph entity "Microsoft" is a non-terminal token corresponding to a matched social-graph entity (e.g. "Microsoft"). As a result, the cost calculation does not incur any insertion cost associated with the non-terminal token [employer] or social-graph entity "Microsoft" and incurs the insertion cost associated with not matching query token [my]. Since there are no remaining n-grams, the insertion cost associated with not matching query tokens [friends], [who], [work], and [at] are incurred, as illustrated by 850-880. Assuming, the base cost of grammar template 810 "photos of my friends who work at [employer]" is 2.1 the insertion costs of not matching query tokens [photos], [of], [my], [friends], [who], [work], [at], and [employer] are 2.2, 0.5, 0, 1.5, 0.1, 0.3, 0.5, and 1.0, respectively. And assuming the insertion cost of social-graph entity "Microsoft" is 0.04, the resultant calculated cost is 5.04 for structured search query "photos of my friends who work at Microsoft."

In particular embodiments, mobile client system 130 may generate one or more structured queries corresponding to the selected grammar templates (e.g., those grammar templates having a score greater than a grammar-threshold score). Each structured query may be based on a string generated by the corresponding selected grammar template. As an example and not by way of limitation, in response to the text query "photo m", the grammar [objects][user-filter][user][user] may generate a string "photos of my friends", where the non-terminal tokens [objects], [user-filter], [user] of the grammar have been replaced by the query tokens [photos], [of], [my], and [friends], respectively, to generate the string. In particular embodiments, a string that is generated by grammar using a natural-language syntax may be rendered as a structured query in natural language. As an example and not by way of limitation, the structured query from the previous example uses the query token [of], which uses a natural-language syntax so that the string rendered by grammar is in natural language. The natural-language string generated by a grammar may then be rendered to form a structured query by modifying the query tokens corresponding to social-graph element to include references to those social-graph elements. As an example and not by way of limitation, the string "photos of my friends" may be rendered so that the query token for "friends" appears in the structured query as a reference to one or more second user nodes 202 corresponding to the friends of the user, where the reference may be include highlighting, an inline link, a snippet, another suitable reference, or any combination thereof. Each structured query may comprise query tokens corresponding to the corresponding selected grammar, where these query tokens correspond to one or more of the identified edges 206 and one or more of the identified nodes.

As described below, the client-side typeahead process may identify one or more structured queries matching text input in search-query field 350. In particular embodiments, the identified structured queries may be ranked based at least in part on a calculated cost, described above. As an example and not by way of limitation, the identified structured queries may be ranked based at least in part on the lowest calculated cost. For example, based on the cost calculations described above, the structured queries identified for text input "photo m" may have an example ranking, from highest ranked to lowest, of "photos of my friends," "photos of my friends who work at Microsoft," and "photos of my friends who work at Facebook." Although this disclosure describes matching and ranking particular text input to particular structured queries in a particular manner, this disclosure contemplates matching and ranking any suitable text input to any suitable structured queries in any suitable manner. More information on using grammar models with search queries may be found in U.S. patent application Ser. No. 13/674, 695, filed 12 Nov. 2012, which is incorporated by reference.

Figure 9:
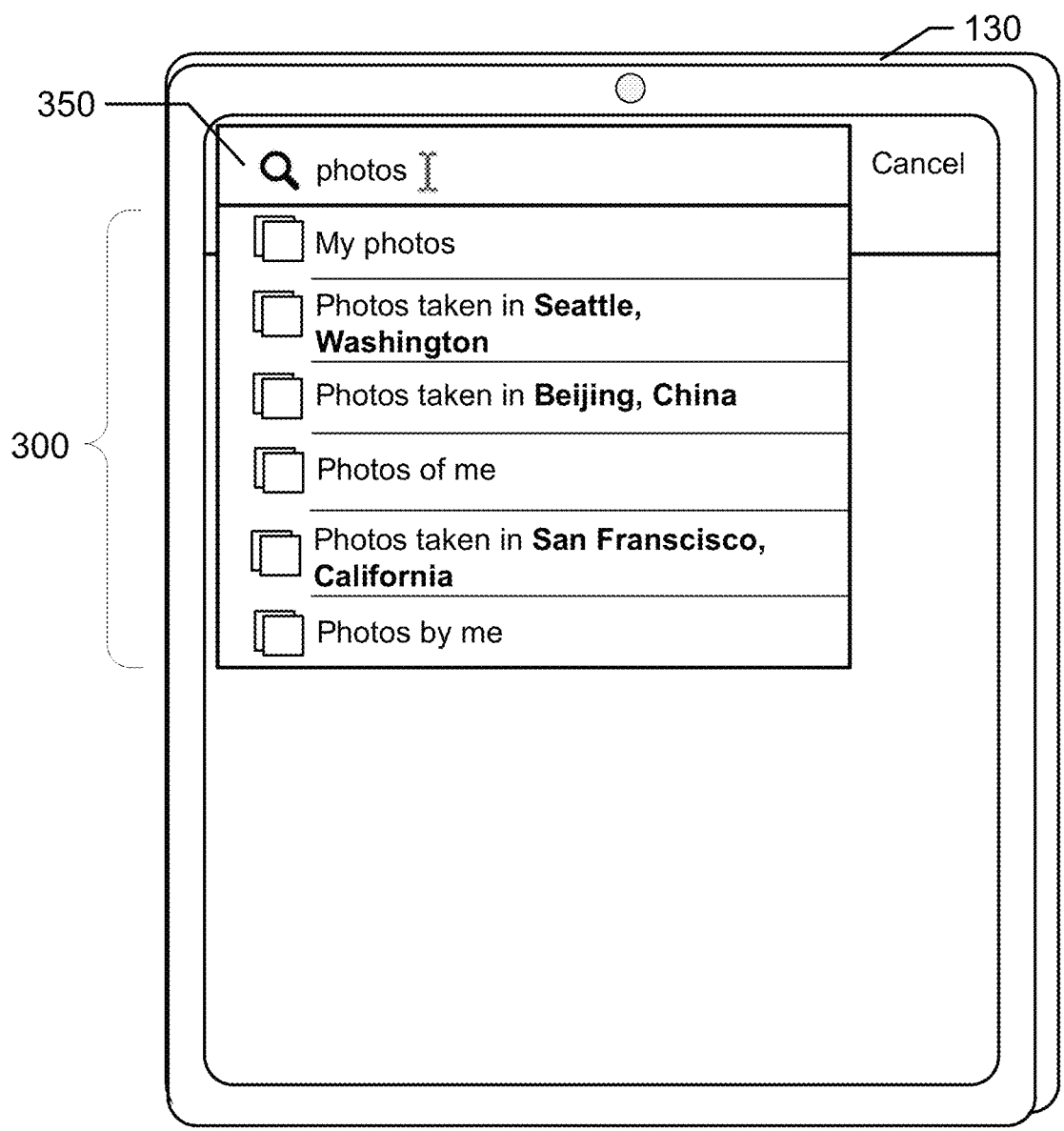
FIG. 9 illustrates an example UI on an example mobile client system with an example structured search query.
Figure 10:
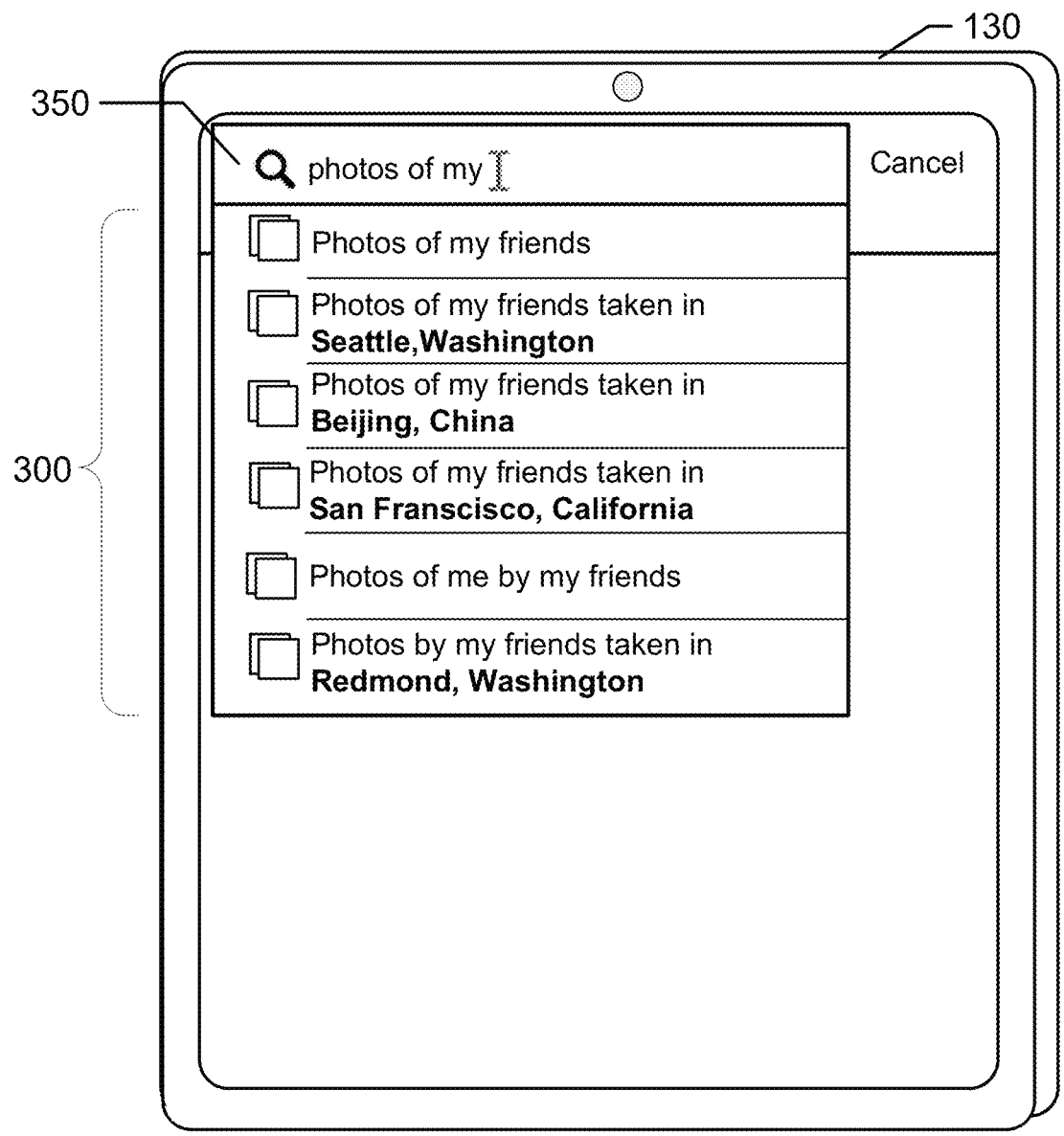
FIG. 10 illustrates an example UI on an example mobile client system with an example structured search query.

FIGS. 9-10 illustrate an example UI on an example mobile client system with example structured search queries. In particular embodiments, after the structured queries are identified, mobile client system 130 may display one or more of the structured queries based on identified grammar templates or stored social-graph entities. The structure queries may be displayed, for example, on a mobile web browser or UI of user's mobile client system 130 that may include, for example, the names (name strings) of the referenced social-graph elements, other query limitations (e.g., Boolean operators, etc.), as well as, potentially, other metadata associated with the referenced social-graph entities. As an example and not by way of limitation, a mobile web browser or UI on the querying user's mobile client system 130 may display the identified structured queries in a drop-down menu 300, as illustrated in FIGS. 9-10. A client-side typeahead process may match the text input in search-query field 350 to the pre-defined grammar templates after each keystroke. In particular embodiments, as the user provides additional characters in search-query field 350, the client-side typeahead process may evaluate the additional text to update the structured queries presented to the user in down-down menu 300. Furthermore, the user may then click on or otherwise select (e.g., tapping on a selected structured query on a display of mobile client system 130) to indicate the particular structured query the user wants the social-networking system 160 to execute. In particular embodiments, the structured queries may be presented to the querying user in a ranked order, such as, for example, based on a cost calculation previously determined as described above. Structured queries with higher rankings may be presented in a more prominent position. Furthermore, in particular embodiments, only structured queries with a cost calculation below a threshold cost value may be displayed to the querying user. As an example and not by way of limitation, as illustrated in FIGS. 9-10, the structured queries may be presented to the querying user in drop-down menu 300 where higher ranked structured queries may be presented at the top of the menu, with lower ranked structured queries presented in descending order in drop-down menu 300. In particular embodiments, one or more references in a structured query may be highlighted (e.g., outlined, underlined, circled, bolded, italicized, colored, lighted, offset, in caps) in order to indicate its correspondence to a particular social-graph element. Furthermore, a graphical indicator that corresponds to a type of search results may be displayed with the structured queries in drop-down menu 300. Although this disclosure describes displaying particular structured queries in a particular manner, this disclosure contemplates displaying any suitable structured queries in any suitable manner.

As described above, the client-side typeahead process may match the text input in search-query field 350 to the pre-defined grammar templates after each keystroke. As a result, the identified structured queries displayed in drop-down menu 300 may be updated after each keystroke. In the example illustrated in FIG. 9, drop-down menu 300 may display the six highest ranked structured queries that match text input "photos." As the user provides additional characters in search-query field 350, the client-side typeahead process may evaluate the additional text to update the structured queries presented to the user in down-down menu 300. In the example illustrated in FIG. 10, drop-down menu 300 may display the six highest ranked structured queries that match text input "photos of my." As an example and not by way of limitation, In particular embodiments, social-networking system 160 may receive from the querying user a selection of one of the structured queries in drop-down menu 300 from mobile client system 130. The nodes and edges referenced in the received structured query may be referred to as the selected nodes and selected edges, respectively. As an example and not by way of limitation, the web browser or UI on the querying user's mobile client system 130 may display the identified structured queries in a drop-down menu 300, as described above, which the user may then click on or otherwise select (e.g., tapping on a selected structured query on a display of mobile client system 130) to indicate the particular structured query the user wants the social-networking system 160 to execute. As an example and not by way of limitation, referencing FIG. 10, the querying user may modify the input subsequent unstructured text query "photos of my" into search-query field 350. Mobile client system 130 may modify the displayed structured queries based on the updated n-grams and recalculated cost for each stored grammar template based on the update n-grams. Upon selecting the particular identified structured query, the user's mobile client system 130 may call or otherwise instruct to the social-networking system 160 to execute the selected structured query. Although this disclosure describes receiving selections of particular structured queries in a particular manner, this disclosure contemplates receiving selections of any suitable structured queries in any suitable manner.

Figure 11:
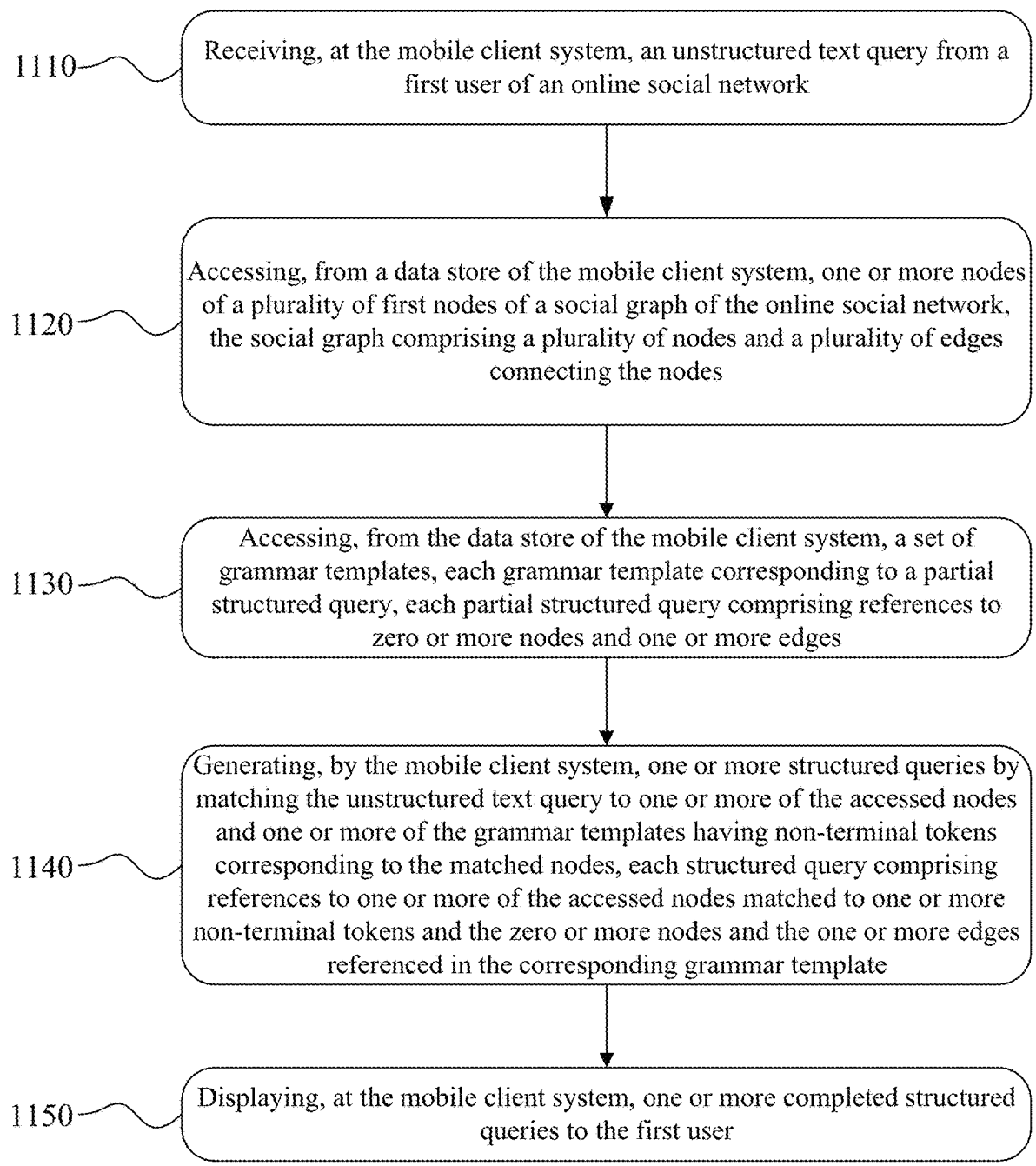
FIG. 11 illustrates an example method for generating client-side structured search queries

FIG. 11 illustrates an example method for generating client-side structured search queries. The method may begin at step 1110, where a mobile client system may receive an unstructured text query from a first user of an online social network. At step 1120, one or more nodes of a number of first nodes of a social graph of the online social network may be accessed from a data store of the mobile client system. In particular embodiments, the social graph includes a number of nodes and a number of edges connecting the nodes. Furthermore, each of the edges between two of the nodes may represent a single degree of separation between them. In particular embodiments, the nodes may include first nodes that each correspond to a concept or a second user associated with the online social network and a second node corresponding to the first user. At step 1130, a set of grammar templates may be accessed from the data store of the mobile client system. In particular embodiments, each grammar template includes one or more non-terminal tokens and one or more query tokens. As described above, query or terminal tokens may correspond to one or more identified social-graph elements. Furthermore, particular non-terminal tokens may be replaced in the grammar template by one or more identified social-graph elements (e.g. query tokens). In particular embodiments, the query tokens include references to zero or more second nodes and one or more edges. As an example and not by way of limitation, each grammar template is based on a natural-language string. At step 1140, the mobile client system may generate one or more completed structured queries by matching the unstructured text query to one or more of the accessed nodes and one or more of the grammar templates having non-terminal tokens corresponding to matched nodes. As an example and not by way of limitation, matching the unstructured text query to one or more of the grammar templates may be based at least in part on a partial character match between one or more n-grams and one or more query tokens of the grammar template. In particular embodiments, each structured query may include references to one or more of the accessed nodes matched to the one or more non-terminal tokens and the zero or more second nodes and the one or more edges referenced in the corresponding grammar template. At step 1150, the mobile client system may display one or more completed structured queries to the first user. Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on a history of the user's actions. Coefficients may be used to predict any number of actions, which may be within or outside of the online social network. As an example and not by way of limitation, these actions may include various types of communications, such as sending messages, posting content, or commenting on content; various types of an observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Systems and Methods

Figure 12:
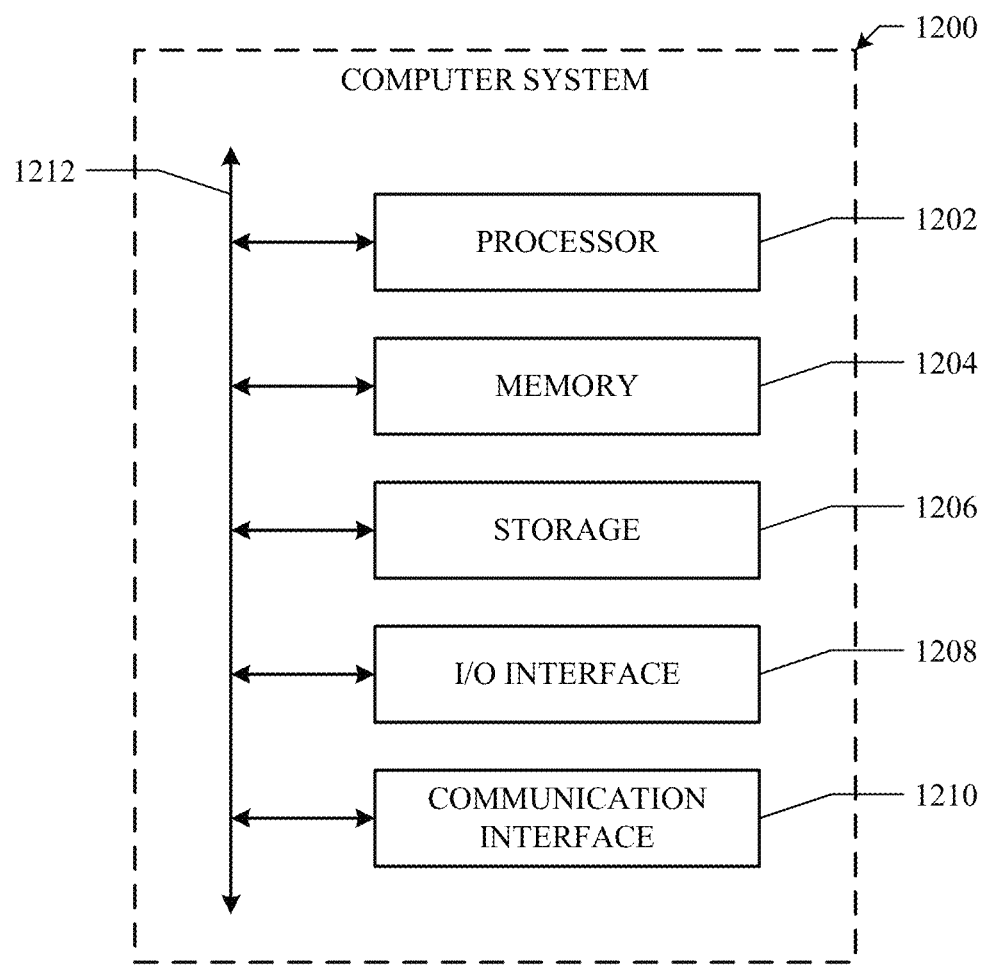
FIG. 12 illustrates an example computer system.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more processors associated with a mobile client system:
   receiving, at the mobile client system, a text string inputted into a query field by a first user;
   accessing, from a local data store of the mobile client system, a set of grammar templates, each grammar template comprising one or more query tokens, wherein the query tokens comprise references to one or more objects stored in the local data store, and wherein each grammar template is based on a natural-language string;
   generating, by the mobile client system, one or more natural-language suggested queries by matching one or more portions of the text string to one or more of the query tokens of one or more of the grammar templates, each suggested query comprising references to one or more of the objects stored in the local data store and the natural-language string of the matching grammar template;
   calculating, by the mobile client system, a cost for each grammar template based at least in part on one or more portions of text string not corresponding to one of the query tokens of the grammar template; and
   displaying, at the mobile client system, one or more suggested queries to the first user, wherein each of the displayed suggested queries has a calculated cost below a threshold cost value.

2. The method of claim 1, wherein each grammar template comprises one or more non-terminal tokens and one or more terminal tokens.

3. The method of claim 1, wherein each suggested query is a structured query referencing one or more objects associated with the online social network.

4. The method of claim 1, further comprising:
   parsing, by the mobile client system, the text string into one or more n-grams; and
   wherein calculating the cost for each grammar template is based on one or more of the n-grams not corresponding to one of the query tokens of the grammar template.

5. The method of claim 1, wherein:
   each query token has an associated insertion cost; and
   calculating the cost for each grammar template is based on an insertion cost for each of the query tokens not corresponding to a portion of the text string.

6. The method of claim 1, wherein calculating the cost comprises identifying, by the mobile client system, a particular query token from one or more of the query tokens that correspond to a particular portion of the text string based at least in part on the insertion cost of each query token.

7. The method of claim 1, wherein calculating the cost comprises:
   associating, by the mobile client system, one of the objects stored in the local data store to one of the query tokens; and
   incurring the insertion cost for the query token and the associated object based on the associated object not corresponding to at least a portion of the text string.

8. The method of claim 1, further comprising:
   ranking, by the mobile client system, one or more of the suggested queries based at least in part on the calculated cost of the associated grammar template.

9. The method of claim 1, wherein calculating the cost comprises incurring a base cost associated with each grammar template, the base cost having an inverse relationship to a popularity measure associated with one or more search queries that are a basis of each grammar template.

10. The method of claim 9, wherein the popularity measure is based at least in part on a search-query history of the first user.

11. The method of claim 9 wherein the popularity measure is based at least in part on a search-query history of users of the online social network.

12. The method of claim 1, wherein receiving the text string inputted into a query field by the first user comprises receiving one or more characters as the user enters the text string into the query field.

13. The method of claim 12, further comprising updating, by the mobile client system, one or more of the suggested queries by matching a text string that is modified as the user enters one or more subsequent characters into the query field.

14. The method of claim 1, wherein each object stored in the local data store has an affinity coefficient above a threshold value.

15. The method of claim 1, further comprising:
   receiving, at the mobile computing device, from the online social network at a pre-determined interval, an updated set of grammar templates or an updated set of objects to store in the local data store.

16. The method of claim 1, further comprising:
   receiving, at the mobile client system, a selection of one of the displayed suggested queries from the first user;
   sending, from the mobile client system, the selected suggested query to the online social network; and
   receiving, at the mobile client system, one or more search results matching the selected suggested query, each search result corresponding to a particular object of the online social network.

17. The method of claim 1, further comprising:
   accessing a set of nodes of a social graph of the online social network, the social graph comprising a plurality of nodes and a plurality of edges connecting the nodes, the nodes comprising:
   a first node corresponding to the first user; and
   a plurality of second nodes corresponding to a plurality of objects associated with the online social network, respectively.

18. The method of claim 1, wherein each suggested query is a structure query one or more nodes and one or more edges of the social graph.

19. One or more computer-readable non-transitory storage media embodying software that is operable when executed by a mobile client system to:
   receive, at the mobile client system, a text string inputted into a query field by a first user;
   access, from a local data store of the mobile client system, a set of grammar templates, each grammar template comprising one or more query tokens, wherein the query tokens comprise references to one or more objects stored in the local data store, and wherein each grammar template is based on a natural-language string;
   generate, by the mobile client system, one or more natural-language suggested queries by matching one or more portions of the text string to one or more of the query tokens of one or more of the grammar templates, each suggested query comprising references to one or more of the objects stored in the local data store and the natural-language string of the matching grammar template;

calculate, by the mobile client system, a cost for each grammar template based at least in part on one or more portions of text string not corresponding to one of the query tokens of the grammar template; and display, at the mobile client system, one or more suggested queries to the first user, wherein each of the displayed suggested queries has a calculated cost below a threshold cost value.

20. A mobile client system comprising: one or more processors; and a memory coupled to the processors comprising instructions executable by the processors, the processors operable when executing the instructions to:

receive, at the mobile client system, a text string inputted into a query field by a first user;

access, from a local data store of the mobile client system, a set of grammar templates, each grammar template comprising one or more query tokens, wherein the query tokens comprise references to one or more objects stored in the local data store, and wherein each grammar template is based on a natural-language string;

generate, by the mobile client system, one or more natural-language suggested queries by matching one or more portions of the text string to one or more of the query tokens of one or more of the grammar templates, each suggested query comprising references to one or more of the objects stored in the local data store and the natural-language string of the matching grammar template;

calculate, by the mobile client system, a cost for each grammar template based at least in part on one or more portions of text string not corresponding to one of the query tokens of the grammar template; and display, at the mobile client system, one or more suggested queries to the first user, wherein each of the displayed suggested queries has a calculated cost below a threshold cost value.

* * * * *